United States Patent
Anders et al.

(10) Patent No.: US 10,902,212 B2
(45) Date of Patent: *Jan. 26, 2021

(54) EMOJI DISAMBIGUATION FOR ONLINE INTERACTIONS

(71) Applicant: International Business Machines Corporation, Armonk, NY (US)

(72) Inventors: Kelley Anders, East New Market, MD (US); Jeremy R. Fox, Georgetown, TX (US); Jonathan Dunne, County Waterford (IE); Liam S. Harpur, Skerries (IE)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/456,950

(22) Filed: Jun. 28, 2019

(65) Prior Publication Data
US 2020/0065386 A1    Feb. 27, 2020

Related U.S. Application Data

(63) Continuation of application No. 16/113,988, filed on Aug. 27, 2018, now Pat. No. 10,387,574.

(51) Int. Cl.
| | | |
|---|---|---|
| *G06F 40/00* | (2020.01) | |
| *G06F 40/30* | (2020.01) | |
| *G06F 17/18* | (2006.01) | |
| *H04L 12/58* | (2006.01) | |
| *G06F 16/901* | (2019.01) | |
| *G06F 40/44* | (2020.01) | |
| *G06F 40/55* | (2020.01) | |
| *G06F 40/45* | (2020.01) | |

(52) U.S. Cl.
CPC .......... *G06F 40/30* (2020.01); *G06F 16/9024* (2019.01); *G06F 17/18* (2013.01); *G06F 40/44* (2020.01); *H04L 51/32* (2013.01); *G06F 40/45* (2020.01); *G06F 40/55* (2020.01)

(58) Field of Classification Search
CPC combination set(s) only.
See application file for complete search history.

(56) References Cited

PUBLICATIONS

List of all IBM's related applications, Appendix P, 2019.

*Primary Examiner* — Vu B Hang
(74) *Attorney, Agent, or Firm* — Garg Law Firm, PLLC; Rakesh Garg; Michael O'Keefe

(57) ABSTRACT

A new data structure of a social clustered topic model comprising new data is constructed, the new data being generated from content of online interactions using a processor and a memory. A social media message is analyzed, using a processor and a memory, to compute an emoji probability score reflecting a degree of correspondence between an emoji present in the social media message and a meaning extracted from the new social clustered topic model. The social media message is modified automatically, when the emoji probability score is above a threshold probability score, by adding additional data to the social media message, the additional data including the meaning.

20 Claims, 6 Drawing Sheets

EMOJI DISAMBIGUATION FOR ONLINE INTERACTIONS

TECHNICAL FIELD

The present invention relates generally to a method, system, and computer program product for enhancing online interactions. More particularly, the present invention relates to a method, system, and computer program product for emoji disambiguation in online interactions.

BACKGROUND

Emojis (singular: emoji) are picture characters originally associated with cellular telephone usage in Japan, but now popular worldwide in all forms of online discourse. Emojis are often pictographs—images of things such as faces, weather, vehicles and buildings, food and drink, animals and plants—or icons that represent emotions, feelings, or activities. For example, some commonly used emojis are a smiling face, a red heart, tearful eyes, and left and right arrows. Emoji characters are presented in black and white, color (on devices that support color display), and some are presented in animated form, usually as a repeating sequence of two to four images—for example, a pulsing red heart—on devices that support such a display.

Emoticons (from "emotion" plus "icon") are emojis that depict facial expression or body posture as a way of conveying emotion or attitude. Pictographs are symbols, that are pictorial representations of objects, sometimes quite simplified. Both emoticons and pictographs are types of emojis. The Unicode Consortium maintains a list of Unicode standard emojis, for use in standardizing communications using emojis. As used herein, the term emoji includes emoticons, pictographs, pictures used in the place of text—whether Unicode-standard or not—as well as text-character emoji equivalents (such as :-) to represent a smiling face).

Emojis are often used in social media communications. Social media comprises any medium, network, channel, or technology for facilitating communication between a large number of individuals and/or entities (users). Some common examples of social media are Facebook or Twitter, each of which facilitates communications in a variety of forms between large numbers of users (Facebook is a trademark of Facebook, Inc. in the United States and in other countries. Twitter is a trademark of Twitter Inc. in the United States and in other countries.) Social media, such as Facebook or Twitter allow users to interact with one another individually, in a group, according to common interests, casually or in response to an event or occurrence, and generally for any reason or no reason at all.

Some other examples of social media are websites or data sources associated with radio stations, news channels, magazines, publications, blogs, and sources or disseminators of news or information. Some more examples of social media are websites or repositories associated with specific industries, interest groups, action groups, committees, organizations, teams, or other associations of users.

Data from social media comprises unidirectional sharing of content, bi-directional messages, or broadcast communications in a variety of languages and forms. Such communications in the social media are commonly referred to as "posts". The contents of posts can include natural language conversation, images, multimedia, and/or links or references, any of which can be in proprietary conversational styles, slangs or acronyms, urban phrases in a given context, formalized writing or publication, and other structured or unstructured data.

Emojis are also commonly used in direct communications between individuals, such as by email, text messages, and direct communications on social media platforms. For example, when arranging a time to meet by texting each other, one friend might suggest a time, and the other friend might respond with the "thumbs up" emoji to indicate agreement.

SUMMARY

The illustrative embodiments provide a method, system, and computer program product. An embodiment includes a method that constructs a new data structure of a social clustered topic model comprising new data, the new data being generated from content of online interactions using a processor and a memory. The embodiment analyzes, using a processor and a memory, a social media message to compute an emoji probability score reflecting a degree of correspondence between an emoji present in the social media message and a meaning extracted from the new social clustered topic model. The embodiment modifies the social media message automatically, when the emoji probability score is above a threshold probability score, by adding additional data to the social media message, the additional data comprising the meaning.

An embodiment includes a computer usable program product. The computer usable program product includes one or more computer-readable storage devices, and program instructions stored on at least one of the one or more storage devices.

An embodiment includes a computer system. The computer system includes one or more processors, one or more computer-readable memories, and one or more computer-readable storage devices, and program instructions stored on at least one of the one or more storage devices for execution by at least one of the one or more processors via at least one of the one or more memories.

BRIEF DESCRIPTION OF THE DRAWINGS

Certain novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

DETAILED DESCRIPTION

Figure 1:
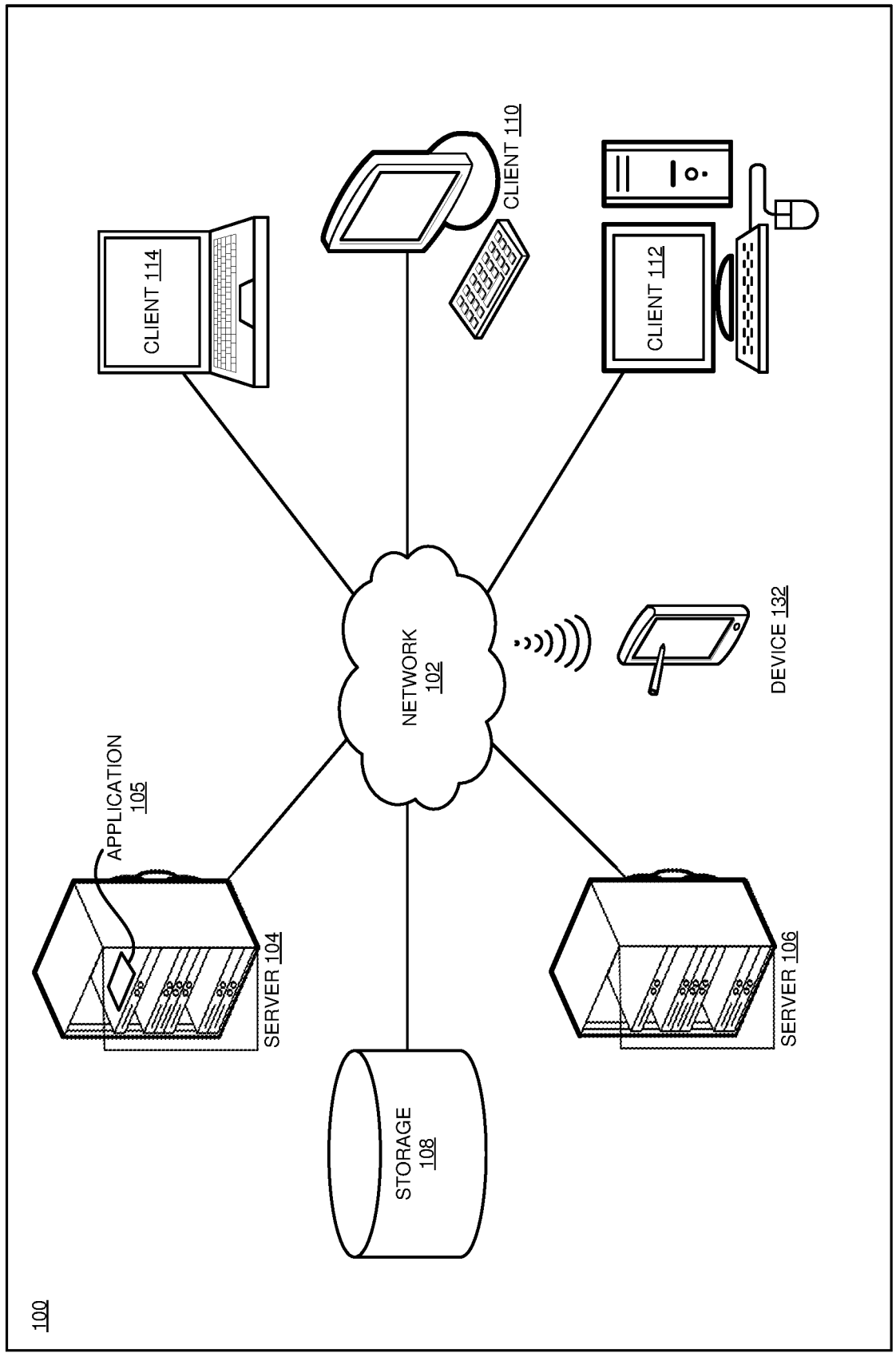
FIG. 1 depicts a block diagram of a network of data processing systems in which illustrative embodiments may be implemented.

Because emojis are pictures, they can often have different meanings, depending on context, current vernacular, and previous interactions of the users and viewers of such emojis. For example, an emoji depicting a red pepper is a plant symbol that represents a food item commonly called a hot pepper or a chili pepper. However, the same emoji is frequently used as a menu symbol to indicate the degree of spiciness in menu items, and as a symbol of acridity of a person's comments. As another example, an emoji depicting a shark might be used to represent the animal, but could also be used to represent slang terms such as "jumping the shark" (referencing something that has reached its peak and begun to decline) or "loan shark" (referencing a lender at a very high interest rate).

As well, particular groups often adopt symbols that have one meaning to group members and another to outsiders. For example, groups have adopted innocuous-seeming symbols, such as pictures of particular foods or cartoon characters, to represent their own group. Others, unaware of the latest trends in symbol adoption, may inadvertently offend simply by using an adopted symbol to reference the symbol's ordinary meaning as, for example, a depicted food item.

In addition, some families of emojis have particular meanings, but only to those familiar with the nuances of those emojis. For example, one reference cites different degrees of affection represented by red, green, and blue heart symbols with one color reserved for friendship and another color meaning love. Those in a group that uses these particular emojis to mean these specific emotions will understand exactly what is being communicated when, for example, a red heart is used in one posting and a green heart is used in another. However, the same reference notes contradictory definitions—for example, the blue heart emoji is said to mean both affection, and the imminent end of a relationship. An outsider, unfamiliar with the particular usage patterns of a group, may simply interpret any heart symbol as representing a human body part or as a suit symbol in a deck of playing cards.

As with other text-based interactions, interactions using emojis often lack the context, nonverbal social cues, nuance, tone, and other meaning signifiers of in-person interactions. As a result, users need assistance in determining what the sender of an emoji, as used in a message or social media post, likely meant by that emoji.

The illustrative embodiments recognize that the presently available tools or solutions do not address these needs or provide adequate solutions for these needs. The illustrative embodiments used to describe the invention generally address and solve the above-described problems and other problems related to emoji disambiguation for online interactions.

An embodiment can be implemented as a software application. The application implementing an embodiment can be configured as a modification of an existing social media or messaging system, as a separate application that operates in conjunction with an existing social media or messaging system, a standalone application, or some combination thereof.

Particularly, some illustrative embodiments provide a method by which an intended, probable, or possible meaning of an emoji can be determined and provided to a user.

An embodiment analyzes interactions on a social media or messaging platform. To determine topics being discussed, an embodiment conducts topic analysis on content on the platform, using any known topic analysis technique. For example, commercially available natural language understanding services analyze unstructured content, including any included emojis, to extract metadata from that content, including concepts, categories, and keywords. Such techniques assign topics to documents, based on topic-related words used in those documents. For example, if a document frequently includes words such as "milk", "meow", and "kitten", such techniques can classify the document as cat-related, while a document that frequently includes "puppy", "bark", and "bone" can be classified as dog-related. In particular, for each piece of content an embodiment examines, the embodiment produces a set of likely topics corresponding to the content, a probability score corresponding to a likelihood that the content relates to each topic, and a set of any emojis found in the content and hence associated with each of the set of likely topics. Here, the set of likely topics includes all topics having a probability score higher than a threshold, or uses any other suitable technique for determining a set of likely topics relating to the content.

An embodiment also analyzes interactions on a social media or messaging platform to construct a model representing relationships between those interacting with each other. A user will have first-degree relationships with other users he or she interacts with directly. For example, if Alice and Bob communicate with each other via a social media or messaging platform, Alice and Bob have a first-degree relationship with other. A user may also have second-degree, third-degree, or higher-degree relationships with users he or she does not interact with directly. For example, if Alice and Bob both do not interact directly with each other, but Alice and Bob both interact directly with Charlie, Alice and Bob have a second-degree relationship with other. Similarly, if Alice interacts directly with Charlie, Charlie interacts directly with Denise, and Denise interacts directly with Bob, Alice and Bob have a third-degree relationship with other. The model can be in any suitable form, for example a social graph. In addition, an embodiment constructs the model using any suitable technique.

Using the results of the topic analysis and the relationship analysis, an embodiment constructs a social clustered topic model (SCTM). The SCTM models the topics of particular users' interactions with which other users, as well as which emojis users employ in relation to which topics and which interactions. In particular, topic analysis provides a listing of terms gleaned from the analyzed content. Relationship analysis provides a social graph in which each user is represented by a node, and relationships of each user to others are represented as lines between the nodes. For each relationship in the social graph, the content is mined to understand which words and emojis are commonly used across which relationships. From there the common words and emojis for an individual's relationships can be clustered, then iteratively aggregated into groups. Based on the frequency of occurrences the SCTM thus models the probability that a given word or phrase corresponds to an associated emoji.

For example, suppose Alice and Bob interact to discuss their proposed recipes for an upcoming hot sauce contest, using the chili pepper emoji to denote a degree of hotness, or spiciness, of various chili peppers and resulting hot sauces. Alice and Ellen interact to rate the attractiveness of characters on a television show they both watch, using the same chili pepper emoji to denote the degree of attractiveness, of each of their subjects. The resulting SCTM thus models a probability that when Alice interacts with Bob on topics related to hot sauce, or recipes, or food in general, her use of the chili pepper emoji denotes hot sauce spiciness, while when Alice interacts with Ellen, particularly regarding that television show, any popular entertainment, or any topic not related to food, her use of the chili pepper emoji denotes attractiveness.

An embodiment constructs the SCTM to reflect any level of generality appropriate to the analyzed content. For example, on one general-purpose platform without many postings there may be only enough content available for analysis to separate food-related topics from topics that are not related to food. On another platform devoted entirely to food-related topics, there may be enough content available to distinguish between variations of individual dishes, such as thin-crust, thicker-crust, and deep dish pizzas.

Another embodiment constructs the SCTM not with reference to particular individuals, but to particular groups of users. For example, the Chilean flag and the Texas state flag look very similar. Both have a white stripe on top and red on the bottom, plus a single star in the middle of a blue field. However, on Chile's flag, the blue is only in the top left corner, whereas on Texas's, the blue is displayed all along the left side. Because emojis are often displayed in a small format, users often mistake the two symbols for each other. The resulting SCTM can model a probability that a Chilean's use of either of the Chilean flag or Texas flag emojis denotes the Chilean flag, while a Texan's use of either of the emojis denotes the Texas flag.

Once an embodiment has analyzed sufficient content to construct an SCTM, the embodiment can use the same analysis tools, as well as the SCTM, to determine the meaning of emojis present in new content. To make this determination, an embodiment applies the results of the topic analysis and the relationships of the users involved in the new content to the SCTM, to determine a probability that an emoji used in the content has a particular meaning.

For example, consider an SCTM that has already analyzed sufficient content to model a probability that when Alice interacts with Bob on topics related to hot sauce, or recipes, or food in general, her use of the chili pepper emoji denotes hot sauce spiciness, while when Alice interacts with Ellen, particularly regarding that television show, any popular entertainment, or any topic not related to food, her use of the chili pepper emoji denotes attractiveness of characters on the show. Now, when an embodiment receives a new message from Alice to Bob that reads, "Are you up for this weekend's hot sauce cookoff?" followed by four chili pepper emojis, an embodiment can analyze the topic of the message as related to spicy food, determine Alice and Bob's first-degree relationship, and apply both to the SCTM to compute a 95 percent probability that the chili pepper emojis, as used in this message, reference spicy food. Similarly, when the embodiment receives a new message from Alice to Ellen that reads, "Did you see last night's episode of our favorite show? The main character's new friend is" followed by four chili pepper emojis. This time the embodiment can analyze the topic of the message as related to the television show, determine Alice and Ellen's first-degree relationship, and apply both to the SCTM to compute an 80 percent probability that the chili pepper emojis, as used in this message, reference the new character's attractiveness.

Some content will not conform closely to previous patterns. Continuing the example, consider the message "Are you up for this weekend's hot sauce cookoff?" followed by four chili pepper emojis, but this time from Alice to a new contact, Felicia. Here, although Alice has not interacted previously with Felicia, the content of the message is sufficiently similar to previously-analyzed messages that the embodiment can compute a 75 percent probability that the chili pepper emojis, as used in this message, reference spicy food. Similarly, consider a more ambiguous message, for example, "How was your weekend?" followed by four chili pepper emojis, but from Alice to Ellen. Here, although the message itself is more ambiguous as to content, Alice and Ellen are already known to use the chili pepper emojis to reference someone's attractiveness. Hence the embodiment can compute a 70 percent probability that the chili pepper emojis, as used in this message, also reference someone's attractiveness. On the other hand, the same message from Alice to a new contact, Georgina, is more ambiguous, as the message lacks a clear topic and the two users do not have an interaction history. Accordingly, here the embodiment computes a 50 percent probability that the chili pepper emojis denote spicy food, and a 50 percent probability that the chili pepper emojis denote attractiveness.

Further, once an embodiment has determined the meaning of emojis present in new content with a probability value above a threshold, the embodiment incorporates that contextual reference, relating an emoji to the text of the content in which it is present, to refine the SCTM and improve future predictions. For example, given a series of messages that include chili pepper emojis but reference not the spicy salsas of Mexican cuisine but spicy regional Chinese food, the STCM would be expanded to model an analysis that both references still refer to spicy food.

An embodiment also provides the contextual reference, suggesting one or more meanings for the emoji, to a user reading the content containing the emoji. One embodiment reports a meaning to a user only if the computed probability of that meaning is above a threshold. Another embodiment reports more than one meaning if no meaning has a probability above the threshold. Another embodiment reports more than one meaning if a probability difference between meanings is within a threshold difference. Another meaning reports probability values for each meaning along with the meanings themselves, to aid a user in making his or her own determination. As a further refinement, an embodiment is configurable to report any of the reports described, or any other suitable report.

The manner of emoji disambiguation in online interactions described herein is unavailable in the presently available methods. A method of an embodiment described herein, when implemented to execute on a device or data processing system, comprises substantial advancement of the functionality of that device or data processing system in analyzing content and user relationships to determine one or more probable meanings of an emoji used in the content and reporting those probable meanings to a user.

The illustrative embodiments are described with respect to certain types of emojis, contents, platforms, probabilities, thresholds, analyses, rankings, devices, data processing systems, environments, components, and applications only as examples. Any specific manifestations of these and other similar artifacts are not intended to be limiting to the invention. Any suitable manifestation of these and other similar artifacts can be selected within the scope of the illustrative embodiments.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Figure 2:
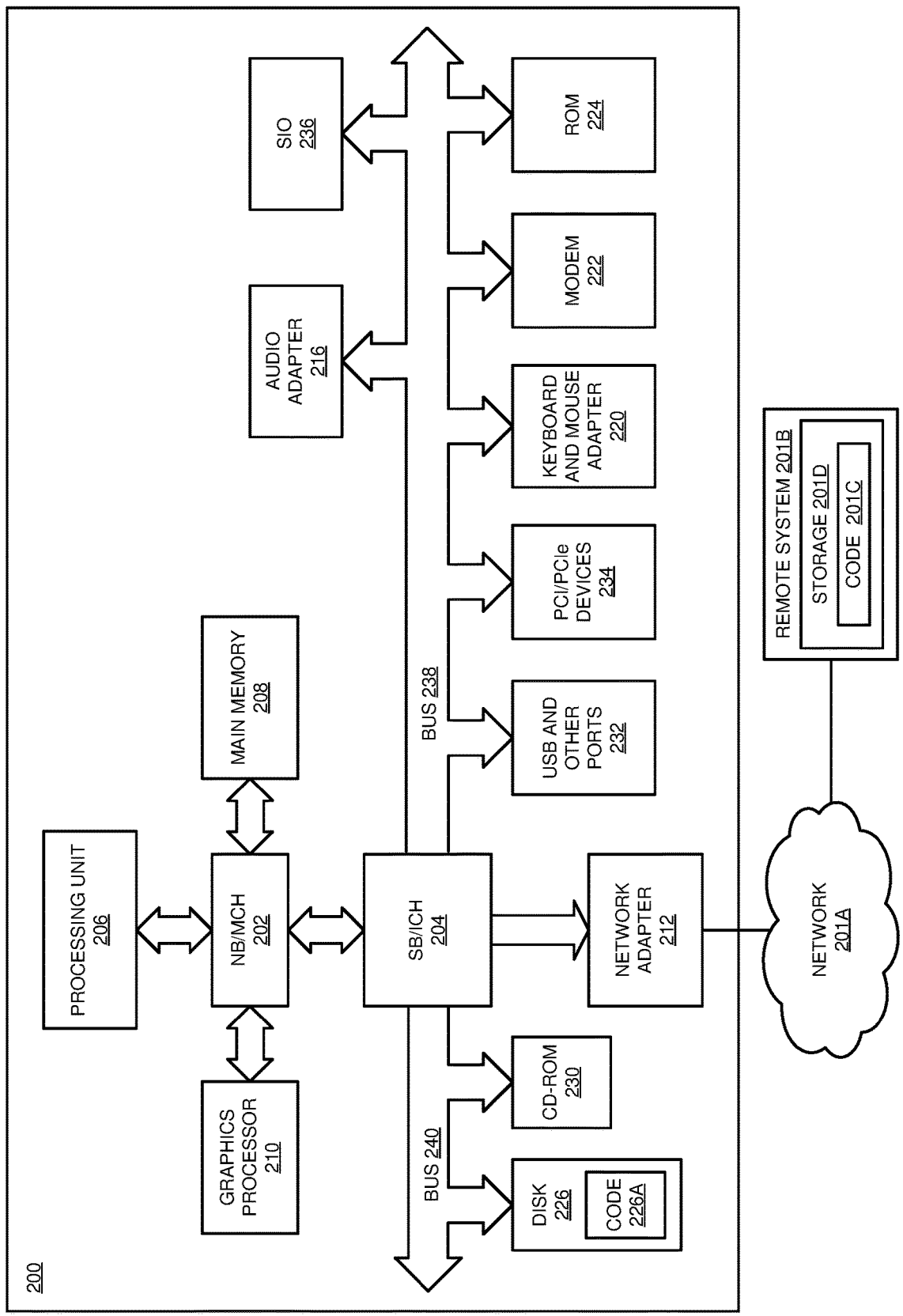
FIG. 2 depicts a block diagram of a data processing system in which illustrative embodiments may be implemented.

With reference to the figures and in particular with reference to FIGS. 1 and 2, these figures are example diagrams of data processing environments in which illustrative embodiments may be implemented. FIGS. 1 and 2 are only examples and are not intended to assert or imply any limitation with regard to the environments in which different embodiments may be implemented. A particular implementation may make many modifications to the depicted environments based on the following description.

FIG. 1 depicts a block diagram of a network of data processing systems in which illustrative embodiments may be implemented. Data processing environment 100 is a network of computers in which the illustrative embodiments may be implemented. Data processing environment 100 includes network 102. Network 102 is the medium used to provide communications links between various devices and computers connected together within data processing environment 100. Network 102 may include connections, such as wire, wireless communication links, or fiber optic cables.

Clients or servers are only example roles of certain data processing systems connected to network 102 and are not intended to exclude other configurations or roles for these data processing systems. Server 104 and server 106 couple to network 102 along with storage unit 108. Software applications may execute on any computer in data processing environment 100. Clients 110, 112, and 114 are also coupled to network 102. A data processing system, such as server 104 or 106, or client 110, 112, or 114 may contain data and may have software applications or software tools executing thereon.

Only as an example, and without implying any limitation to such architecture, FIG. 1 depicts certain components that are usable in an example implementation of an embodiment. For example, servers 104 and 106, and clients 110, 112, 114, are depicted as servers and clients only as example and not to imply a limitation to a client-server architecture. As another example, an embodiment can be distributed across several data processing systems and a data network as shown, whereas another embodiment can be implemented on a single data processing system within the scope of the illustrative embodiments. Data processing systems 104, 106, 110, 112, and 114 also represent example nodes in a cluster, partitions, and other configurations suitable for implementing an embodiment.

Device 132 is an example of a device described herein. For example, device 132 can take the form of a smartphone, a tablet computer, a laptop computer, client 110 in a stationary or a portable form, a wearable computing device, or any other suitable device. Any software application described as executing in another data processing system in FIG. 1 can be configured to execute in device 132 in a similar manner. Any data or information stored or produced in another data processing system in FIG. 1 can be configured to be stored or produced in device 132 in a similar manner.

Application 105 implements an embodiment described herein. As an example, a user may interact with another user on a social media platform or send a message to another user using device 132 or any of clients 110, 112, and 114. Application 105 may also execute in any of servers 104 and 106, clients 110, 112, and 114, and device 132.

Servers 104 and 106, storage unit 108, and clients 110, 112, and 114, and device 132 may couple to network 102 using wired connections, wireless communication protocols, or other suitable data connectivity. Clients 110, 112, and 114 may be, for example, personal computers or network computers.

In the depicted example, server 104 may provide data, such as boot files, operating system images, and applications to clients 110, 112, and 114. Clients 110, 112, and 114 may be clients to server 104 in this example. Clients 110, 112, 114, or some combination thereof, may include their own data, boot files, operating system images, and applications. Data processing environment 100 may include additional servers, clients, and other devices that are not shown.

In the depicted example, data processing environment 100 may be the Internet. Network 102 may represent a collection of networks and gateways that use the Transmission Control Protocol/Internet Protocol (TCP/IP) and other protocols to communicate with one another. At the heart of the Internet is a backbone of data communication links between major nodes or host computers, including thousands of commercial, governmental, educational, and other computer systems that route data and messages. Of course, data processing environment 100 also may be implemented as a number of different types of networks, such as for example, an intranet, a local area network (LAN), or a wide area network (WAN). FIG. 1 is intended as an example, and not as an architectural limitation for the different illustrative embodiments.

Among other uses, data processing environment 100 may be used for implementing a client-server environment in which the illustrative embodiments may be implemented. A client-server environment enables software applications and data to be distributed across a network such that an application functions by using the interactivity between a client data processing system and a server data processing system. Data processing environment 100 may also employ a service oriented architecture where interoperable software components distributed across a network may be packaged together as coherent business applications. Data processing environment 100 may also take the form of a cloud, and employ a cloud computing model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service.

With reference to FIG. 2, this figure depicts a block diagram of a data processing system in which illustrative embodiments may be implemented. Data processing system 200 is an example of a computer, such as servers 104 and 106, or clients 110, 112, and 114 in FIG. 1, or another type of device in which computer usable program code or instructions implementing the processes may be located for the illustrative embodiments.

Data processing system 200 is also representative of a data processing system or a configuration therein, such as data processing system 132 in FIG. 1 in which computer usable program code or instructions implementing the processes of the illustrative embodiments may be located. Data processing system 200 is described as a computer only as an example, without being limited thereto. Implementations in the form of other devices, such as device 132 in FIG. 1, may modify data processing system 200, such as by adding a touch interface, and even eliminate certain depicted components from data processing system 200 without departing from the general description of the operations and functions of data processing system 200 described herein.

In the depicted example, data processing system 200 employs a hub architecture including North Bridge and memory controller hub (NB/MCH) 202 and South Bridge and input/output (I/O) controller hub (SB/ICH) 204. Processing unit 206, main memory 208, and graphics processor 210 are coupled to North Bridge and memory controller hub (NB/MCH) 202. Processing unit 206 may contain one or more processors and may be implemented using one or more heterogeneous processor systems. Processing unit 206 may be a multi-core processor. Graphics processor 210 may be coupled to NB/MCH 202 through an accelerated graphics port (AGP) in certain implementations.

In the depicted example, local area network (LAN) adapter 212 is coupled to South Bridge and I/O controller hub (SB/ICH) 204. Audio adapter 216, keyboard and mouse adapter 220, modem 222, read only memory (ROM) 224, universal serial bus (USB) and other ports 232, and PCI/PCIe devices 234 are coupled to South Bridge and I/O controller hub 204 through bus 238. Hard disk drive (HDD) or solid-state drive (SSD) 226 and CD-ROM 230 are coupled to South Bridge and I/O controller hub 204 through bus 240. PCI/PCIe devices 234 may include, for example, Ethernet adapters, add-in cards, and PC cards for notebook computers. PCI uses a card bus controller, while PCIe does not. ROM 224 may be, for example, a flash binary input/output system (BIOS). Hard disk drive 226 and CD-ROM 230 may use, for example, an integrated drive electronics (IDE), serial advanced technology attachment (SATA) interface, or variants such as external-SATA (eSATA) and micro-SATA (mSATA). A super I/O (SIO) device 236 may be coupled to South Bridge and I/O controller hub (SB/ICH) 204 through bus 238.

Memories, such as main memory 208, ROM 224, or flash memory (not shown), are some examples of computer usable storage devices. Hard disk drive or solid state drive 226, CD-ROM 230, and other similarly usable devices are some examples of computer usable storage devices including a computer usable storage medium.

An operating system runs on processing unit 206. The operating system coordinates and provides control of various components within data processing system 200 in FIG. 2. The operating system may be a commercially available operating system for any type of computing platform, including but not limited to server systems, personal computers, and mobile devices. An object oriented or other type of programming system may operate in conjunction with the operating system and provide calls to the operating system from programs or applications executing on data processing system 200.

Instructions for the operating system, the object-oriented programming system, and applications or programs, such as application 105 in FIG. 1, are located on storage devices, such as in the form of code 226A on hard disk drive 226, and may be loaded into at least one of one or more memories, such as main memory 208, for execution by processing unit 206. The processes of the illustrative embodiments may be performed by processing unit 206 using computer implemented instructions, which may be located in a memory, such as, for example, main memory 208, read only memory 224, or in one or more peripheral devices.

Furthermore, in one case, code 226A may be downloaded over network 201A from remote system 201B, where similar code 201C is stored on a storage device 201D. in another case, code 226A may be downloaded over network 201A to remote system 201B, where downloaded code 201C is stored on a storage device 201D.

The hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. In addition, the processes of the illustrative embodiments may be applied to a multiprocessor data processing system.

In some illustrative examples, data processing system 200 may be a personal digital assistant (PDA), which is generally configured with flash memory to provide non-volatile memory for storing operating system files and/or user-generated data. A bus system may comprise one or more buses, such as a system bus, an I/O bus, and a PCI bus. Of course, the bus system may be implemented using any type of communications fabric or architecture that provides for a transfer of data between different components or devices attached to the fabric or architecture.

A communications unit may include one or more devices used to transmit and receive data, such as a modem or a network adapter. A memory may be, for example, main memory 208 or a cache, such as the cache found in North Bridge and memory controller hub 202. A processing unit may include one or more processors or CPUs.

The depicted examples in FIGS. 1-2 and above-described examples are not meant to imply architectural limitations. For example, data processing system 200 also may be a tablet computer, laptop computer, or telephone device in addition to taking the form of a mobile or wearable device.

Where a computer or data processing system is described as a virtual machine, a virtual device, or a virtual component, the virtual machine, virtual device, or the virtual component operates in the manner of data processing system 200 using virtualized manifestation of some or all components depicted in data processing system 200. For example, in a virtual machine, virtual device, or virtual component, processing unit 206 is manifested as a virtualized instance of all or some number of hardware processing units 206 available in a host data processing system, main memory 208 is manifested as a virtualized instance of all or some portion of main memory 208 that may be available in the host data processing system, and disk 226 is manifested as a virtualized instance of all or some portion of disk 226 that may be available in the host data processing system. The host data processing system in such cases is represented by data processing system 200.

Figure 3:
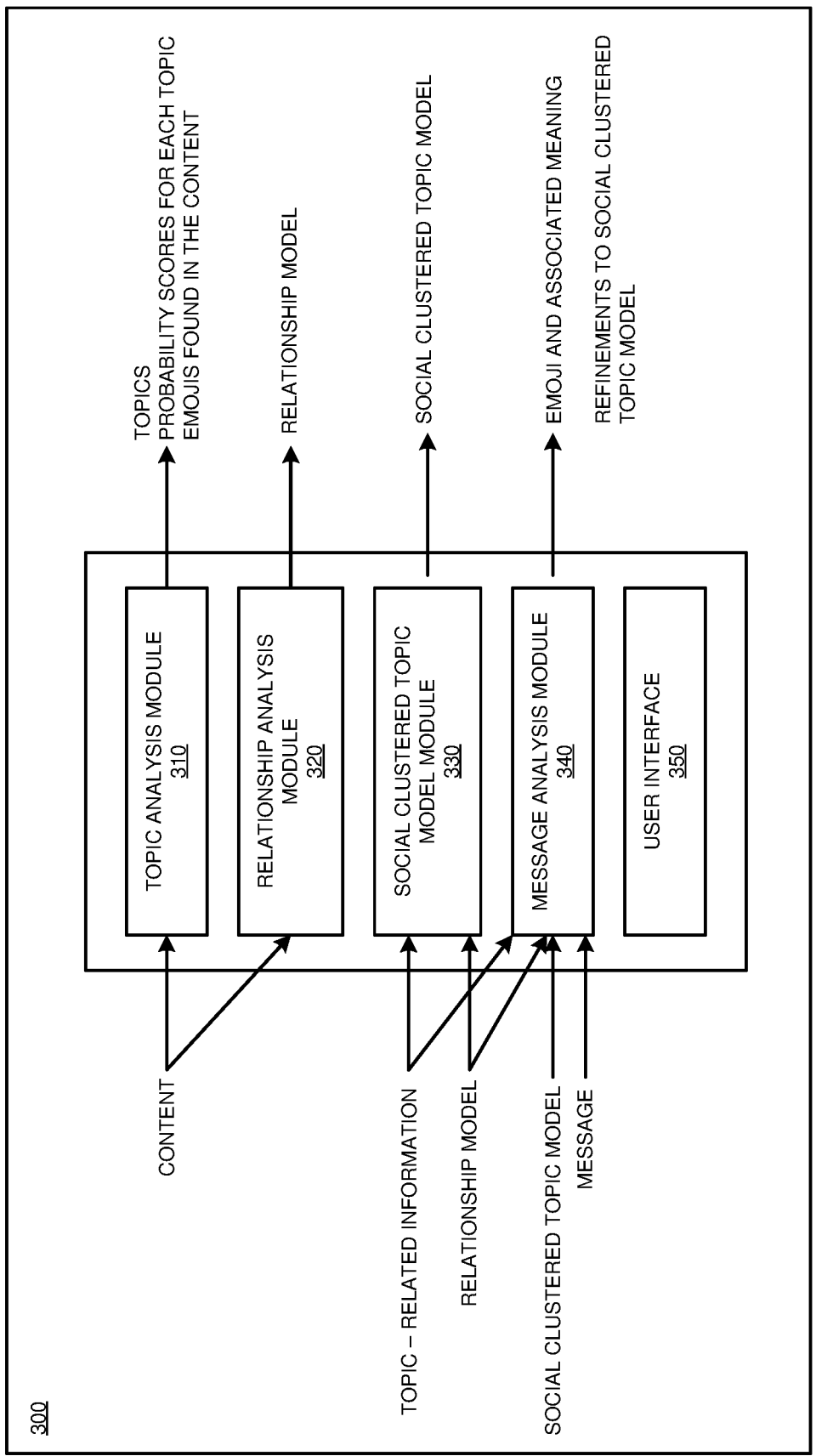
FIG. 3 depicts a block diagram of an example configuration for emoji disambiguation for online interactions in accordance with an illustrative embodiment.

With reference to FIG. 3, this figure depicts a block diagram of an example configuration for emoji disambiguation for online interactions in accordance with an illustrative embodiment. Application 300 is an example of application 105 in FIG. 1 and executes in server 104, in FIG. 1, or any other suitable location.

Application 300 receives content on a social media or messaging platform. To determine topics being discussed, topic analysis module 310 conducts topic analysis on content on the platform, using any known topic analysis technique. For example, commercially available natural language understanding services analyze unstructured content, including any included emojis, to extract metadata from that content, including concepts, categories, and keywords. Such techniques assign topics to documents, based on topic-related words used in those documents. Topic analysis module 310 produces a set of likely topics corresponding to the content, a probability score corresponding to a likelihood that the content relates to each topic, and a set of any emojis found in the content and hence associated with each of the set of likely topics. Here, the set of likely topics includes all topics having a probability score higher than a threshold, or uses any other suitable technique for determining a set of likely topics relating to the content.

Relationship analysis module 320 analyzes interactions within the content to construct a model representing relationships between those interacting with each other. A user may have first-, second-, third-, or higher-degree relationships with other users.

Using the output of topic analysis module 310 and relationship analysis module 320, social clustered topic model module 330 constructs an SCTM. The SCTM models the topics of particular users' interactions with which other users, as well as which emojis users employ in relation to which topics and which interactions. Social clustered topic model module 330 constructs the SCTM to reflect any level of generality appropriate to the analyzed content, and with reference to either individuals or groups as appropriate to the analyzed content.

Once application 300 has analyzed sufficient content to construct an SCTM, message analysis module 340 uses topic analysis module 310, relationship analysis module 320, and social clustered topic module 330 to determine the meaning of emojis present in newly-posted content or messages. To make this determination, an embodiment applies the results of the topic analysis and the relationships of the users involved in the new content to the SCTM, to determine a probability that an emoji used in the content has a particular meaning. Once message analysis module 340 has determined the meaning of any emojis present in new content with a probability value above a threshold, the results, relating an emoji to the text of the content in which it is present, are used to refine the SCTM and improve future predictions.

Using user interface 350, application 300 provides emojis and their determined meanings to a user. User interface 350 reports a meaning to a user only if the computed probability of that meaning is above a threshold. Alternatively, user interface 350 reports more than one meaning if no meaning has a probability above the threshold. Alternatively, user interface 350 reports more than one meaning if a probability difference between meanings is within a threshold difference. Alternatively, user interface 350 reports probability values for each meaning along with the meanings themselves, to aid a user in making his or her own determination. As a further refinement, user interface 350 is configurable to report any of the reports described, or any other suitable report.

Figure 4:
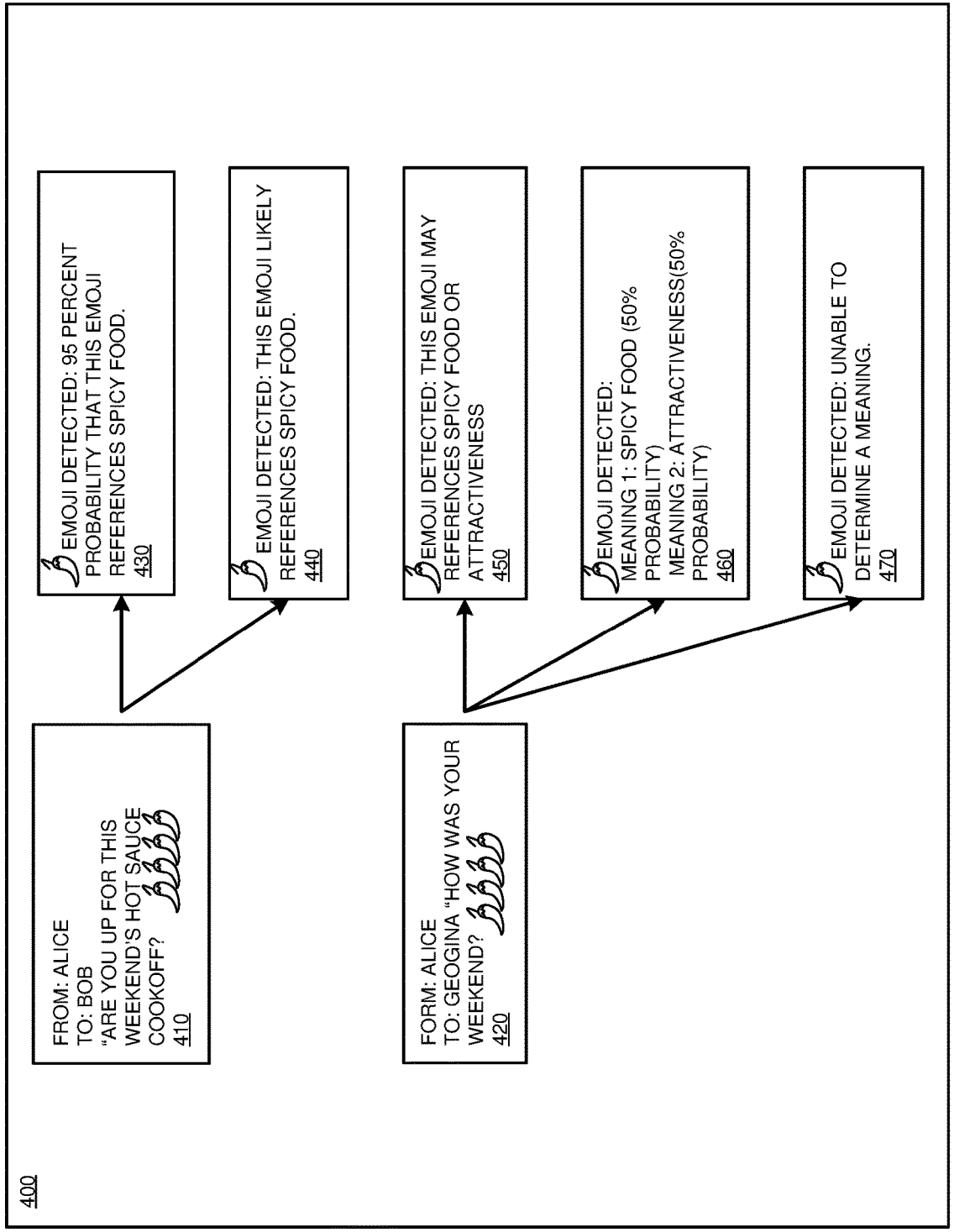
FIG. 4 depicts examples of messages including emojis and examples of the results displayed to a user, in accordance with an illustrative embodiment.

With reference to FIG. 4, this figure depicts examples of messages including emojis and examples of the results displayed to a user, in accordance with an illustrative embodiment. The results depicted are obtained using application 300 in FIG. 3.

Message 410 is from Alice to Bob. Application 300 has already determined, from previous interactions, that when Alice interacts with Bob on topics related to hot sauce, or recipes, or food in general, her use of the chili pepper emoji denotes hot sauce spiciness. As a result, when Alice sends Bob a message that reads, "Are you up for this weekend's hot sauce cookoff?" followed by four chili pepper emojis, application 300 analyzes the topic of message 410 as related to spicy food, determines Alice and Bob's first-degree relationship, and applies both to the SCTM to compute a 95 percent probability that the chili pepper emojis, as used in this message, reference spicy food.

Because the 95 percent probability is above a threshold, the user interface of application 300 displays one of messages 430 and 440. Message 430 reports both the probable meaning of the chili pepper emoji (spicy food) and probability score (95 percent), while message 440 simply reports the probable meaning of the chili pepper emoji.

Message 420 is from Alice to Georgina. Alice has not previously interacted with Georgina, and the message lacks a clear topic. However, Alice has previously used the chili pepper to denote both spicy food and male attractiveness, depending on the context. Accordingly, here application 300 computes a 50 percent probability that the chili pepper emojis denote spicy food, and a 50 percent probability that the chili pepper emojis denote attractiveness.

Because the 50 percent probability is below a threshold, the user interface of application 300 displays one of messages 450, 460, and 470. Message 450 reports both possible meanings, since no meaning has a probability above the threshold. Message 450 also serves as an example of a report when the probability difference between meanings (here, zero) is within a threshold difference. Message 460 reports probability values for each meaning along with the meanings themselves, to aid a user in making his or her own determination. And because the probabilities were both 50 percent, message 470 reports that an emoji was detected, but that the application was unable to determine a meaning.

Figure 5:
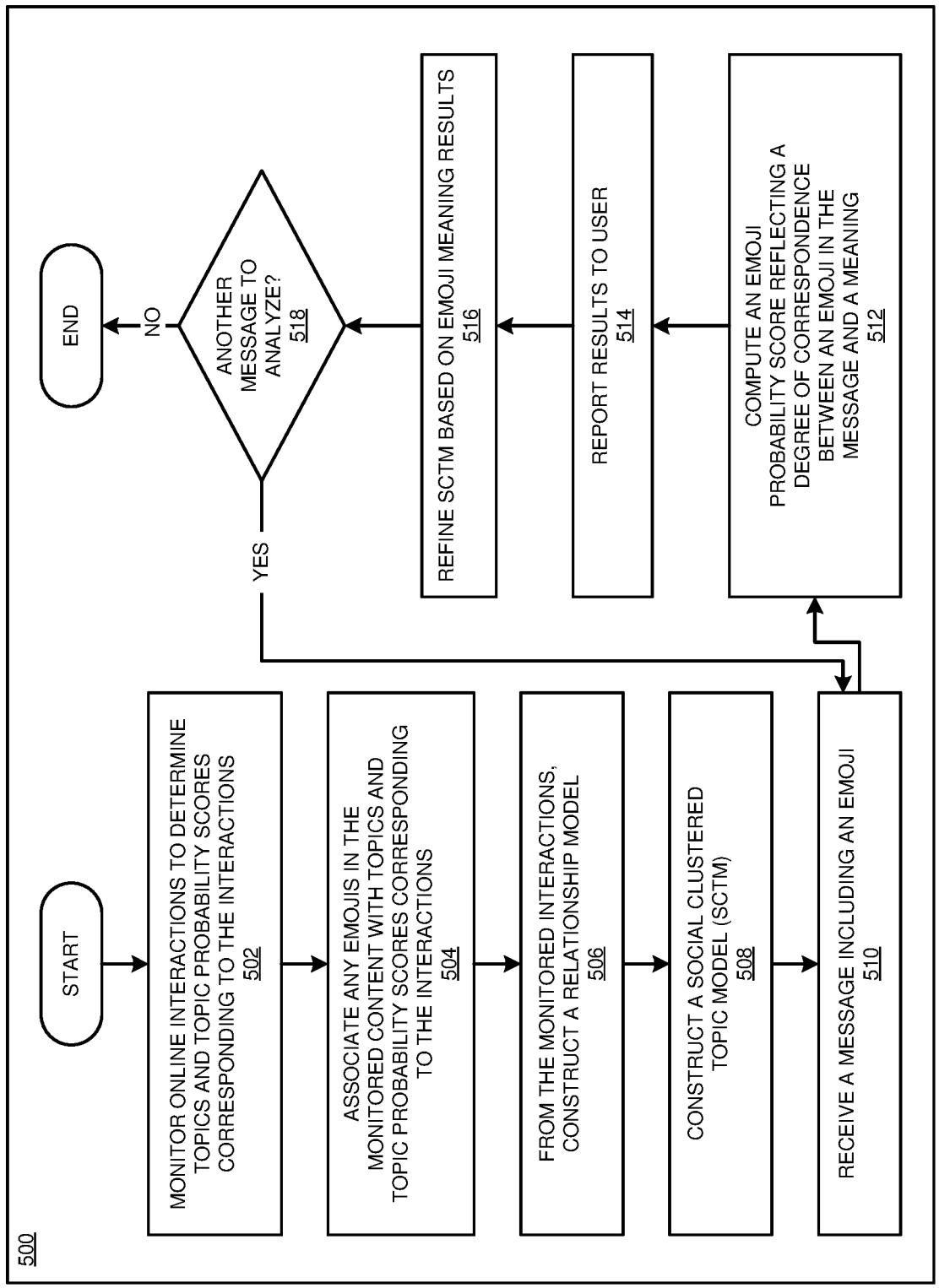
FIG. 5 depicts a flowchart of an example process for emoji disambiguation for online interactions in accordance with an illustrative embodiment.

With reference to FIG. 5, this figure depicts a flowchart of an example process for emoji disambiguation for online interactions in accordance with an illustrative embodiment. Process 500 can be implemented in application 300 in FIG. 3.

In block 502, the application monitors online interactions to determine topics and topic probability scores corresponding to the interactions. In block 504, the application associates any emojis in the monitored content with topics and topic probability scores corresponding to the interactions. In block 506, the application constructs a relationship model from the monitored interactions. In block 508, the application constructs an SCTM. In block 510, the application receives a message including an emoji. In block 512, the application computes an emoji probability score reflecting a degree of correspondence between an emoji in the message and a meaning. In block 514, the application reports the results, including any determined meanings for the emoji and (optionally) any associated probabilities, to a user. In block 516, the application refines the SCTM based on the emoji meaning results. In block 518, the application determines whether to wait for another message to analyze. If yes, the application returns to block 510; if not; the application ends.

Figure 6:
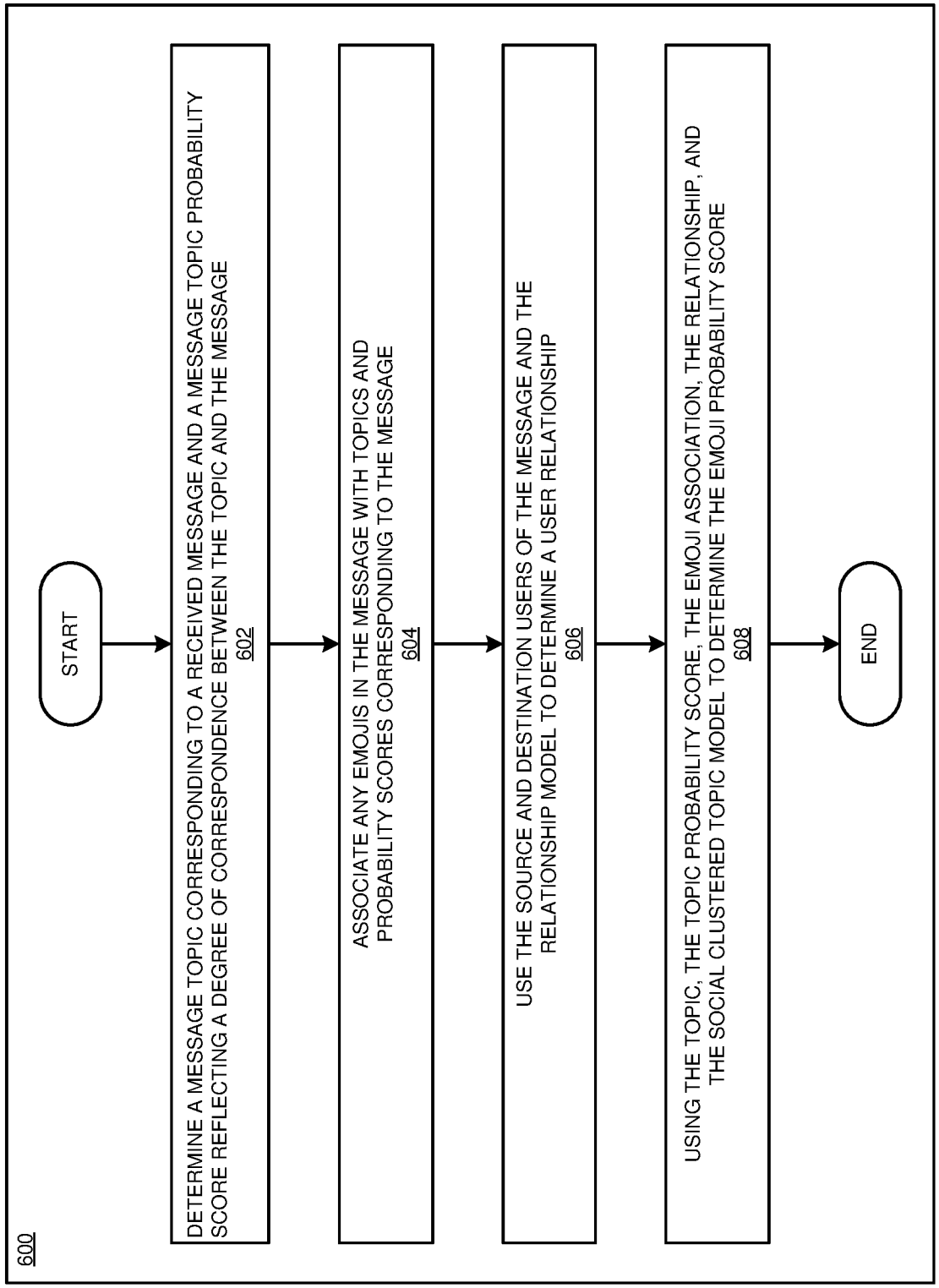
FIG. 6 depicts a flowchart of a portion of an example process for emoji disambiguation for online interactions in accordance with an illustrative embodiment.

With reference to FIG. 6, this figure depicts a flowchart of a portion of an example process for emoji disambiguation for online interactions in accordance with an illustrative embodiment. Process 600 can be implemented in application 300 in FIG. 3, and gives further detail of box 512 in FIG. 5.

In block 602, the application determines a message topic corresponding to a received message, and a message topic probability score reflecting a degree of correspondence between the topic and the received message. In block 604, the applications associates any emojis in the message with topics and probability scores corresponding to the message. In block 606, the application uses the source and destination users of the message, and the relationship model, to determine a user relationship. In block 608, the application uses the topic, topic probability score, emoji association, user relationship, and SCTM to determine an emoji probability score. Then the application ends.

Thus, a computer implemented method, system or apparatus, and computer program product are provided in the illustrative embodiments for emoji disambiguation for online interactions g and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer-implemented method comprising:
   receiving a social media message that includes an emoji;
   computing an emoji probability score reflecting a degree of correspondence between the emoji present in the social media message and a meaning extracted from a social clustered topic model;
   modifying the social media message automatically, when the emoji probability score is above a threshold probability score, by adding additional data to the social media message, the additional data comprising the meaning, and
   displaying the modified social media message.

2. The method of claim 1, further comprising:
   determining, from a content of online interactions, a topic corresponding to the content and a topic probability score reflecting a degree of correspondence between the topic and the content;
   associating an emoji present in the content with the topic and the probability score;
   constructing, from online interactions, a relationship model representing a relationship between a source user of an interaction and a destination user of the interaction; and
   constructing, from the topic, the topic probability score, the emoji association, and the relationship model, a new data structure of the social clustered topic model.

3. The method of claim 2, wherein the relationship model comprises a social graph.

4. The method of claim 2, wherein analyzing the social media message further comprises:
   determining, from the social media message, a message topic corresponding to the message and a message topic probability score reflecting a degree of correspondence between the topic and the message;
   associating an emoji present in the message with the topic and the topic probability score;
   determining, from a source user of the message, a destination user of the message, and the relationship model, a relationship between the source user and the destination user; and
   computing, using the topic, the topic probability score, the emoji association, the relationship, and the social clustered topic model, the emoji probability score.

5. The method of claim 4, further comprising:
   updating, using the topic, the topic probability score, the emoji association, the relationship, and the emoji probability score, the social clustered topic model.

6. The method of claim 1, further comprising:
   modifying the social media message automatically, when the emoji probability score is above a threshold probability score, by adding additional data to the social media message, the additional data comprising the emoji probability score.

7. The method of claim 1, further comprising:
   modifying the social media message automatically, when a difference between the emoji probability score and a second emoji probability score corresponding to a second meaning of the emoji is below a threshold difference, by adding additional data to the social media message, the additional data comprising the meaning corresponding to the emoji probability score and the second meaning.

8. The method of claim 7, further comprising:
   modifying the social media message automatically by adding additional data, the additional data comprising the emoji probability score and the second emoji probability score.

9. A computer usable program product comprising one or more computer-readable storage medium, and program instructions stored on at least one of the one or more storage medium, the stored program instructions comprising:
   program instructions to receive a social media message that includes an emoji;
   program instructions to compute an emoji probability score reflecting a degree of correspondence between the emoji present in the social media message and a meaning extracted from a social clustered topic model;
   program instructions to modify the social media message automatically, when the emoji probability score is above a threshold probability score, by adding additional data to the social media message, the additional data comprising the meaning, and
   program instructions to display the modified social media message.

10. The computer usable program product of claim 9, further comprising:

program instructions to determine, from a content of online interactions, a topic corresponding to the content and a topic probability score reflecting a degree of correspondence between the topic and the content;

program instructions to associate an emoji present in the content with the topic and the probability score;

program instructions to construct, from online interactions, a relationship model representing a relationship between a source user of an interaction and a destination user of the interaction; and constructing, from the topic, the topic probability score, the emoji association, and the relationship model, a new data structure of the social clustered topic model.

11. The computer usable program product of claim 10, wherein the relationship model comprises a social graph.

12. The computer usable program product of claim 10, wherein program instructions to analyze the social media message further comprises:

program instructions to determine, from the social media message, a message topic corresponding to the message and a message topic probability score reflecting a degree of correspondence between the topic and the message;

program instructions to associate an emoji present in the message with the topic and the topic probability score;

program instructions to determine, from a source user of the message, a destination user of the message, and the relationship model, a relationship between the source user and the destination user; and program instructions to compute, using the topic, the topic probability score, the emoji association, the relationship, and the social clustered topic model, the emoji probability score.

13. The computer usable program product of claim 12, further comprising:

program instructions to update, using the topic, the topic probability score, the emoji association, the relationship, and the emoji probability score, the social clustered topic model.

14. The computer usable program product of claim 9, further comprising:

program instructions to modify the social media message automatically, when the emoji probability score is above a threshold probability score, by adding additional data to the social media message, the additional data comprising the emoji probability score.

15. The computer usable program product of claim 9, further comprising:

program instructions to modify the social media message automatically, when a difference between the emoji probability score and a second emoji probability score corresponding to a second meaning of the emoji is below a threshold difference, by adding additional data to the social media message, the additional data comprising the meaning corresponding to the emoji probability score and the second meaning.

16. The computer usable program product of claim 15, further comprising:

program instructions to modifying the social media message automatically by adding additional data, the additional data comprising the emoji probability score and the second emoji probability score.

17. The computer usable program product of claim 9, wherein the computer usable code is stored in a computer readable storage medium in a data processing system, and wherein the computer usable code is transferred over a network from a remote data processing system.

18. The computer usable program product of claim 9, wherein the computer usable code is stored in a computer readable storage medium in a server data processing system, and wherein the computer usable code is downloaded over a network to a remote data processing system for use in a computer readable storage medium associated with the remote data processing system.

19. A computer system comprising one or more processors, one or more computer-readable memories, and one or more computer-readable storage medium, and program instructions stored on at least one of the one or more storage medium for execution by at least one of the one or more processors via at least one of the one or more memories, the stored program instructions comprising:

program instructions to receive a social media message that includes an emoji;

program instructions to compute an emoji probability score reflecting a degree of correspondence between the emoji present in the social media message and a meaning extracted from a social clustered topic model;

program instructions to modify the social media message automatically, when the emoji probability score is above a threshold probability score, by adding additional data to the social media message, the additional data comprising the meaning, and program instructions to display the modified social media message.

20. The computer system of claim 19, further comprising:

program instructions to determine, from a content of online interactions, a topic corresponding to the content and a topic probability score reflecting a degree of correspondence between the topic and the content;

program instructions to associate an emoji present in the content with the topic and the probability score;

program instructions to construct, from online interactions, a relationship model representing a relationship between a source user of an interaction and a destination user of the interaction; and constructing, from the topic, the topic probability score, the emoji association, and the relationship model, a new data structure of the social clustered topic model.

* * * * *